UNITED STATES PATENT OFFICE.

GEORGE ANDREW BABBITT, OF BROWNSBOROUGH, KENTUCKY.

METHOD OF PROTECTING THE BUDS OF FRUIT-TREES.

SPECIFICATION forming part of Letters Patent No. 496,376, dated April 25, 1893.

Application filed November 14, 1892. Serial No. 451,985. (No specimens.)

*To all whom it may concern:*

Be it known that I, GEORGE ANDREW BABBITT, a citizen of the United States, residing at Brownsborough, in the county of Oldham and State of Kentucky, have invented certain new and useful Improvements in Methods of Protecting the Buds of Fruit-Trees; and I do declare the following to be a full, clear, and exact description of the invention.

This invention relates to certain new and useful improvements in methods of treating fruit trees for the purpose of preventing the fruit-buds from being killed by frost during the winter season. It is a well known fact that during protracted warm intervals during the winter season, the buds upon fruit trees are partially developed, and that upon the return of cold weather the growth of the buds will be suddenly arrested and frequently the buds will be killed by the frost. I have discovered that this destruction of the fruit buds by the frost may be obviated by keeping the limbs of the trees, with the buds thereon incased in an artificial covering of ice.

In carrying out my invention, it is my practice to spray the limbs of the fruit trees with water, upon the occurrence of cold weather, after each warm period during the winter season. This spraying is done as soon as the temperature has fallen below the freezing point, and the spray is thus permitted to be frozen upon the trees, incasing both the limbs and the buds thereon in a coating of ice, which covering I have found to afford adequate protection from such extreme low temperatures as would be likely to destroy the fruit buds. By this process I am not only able to protect the buds from injury by the frost, but, the trees when treated as described will be found to produce an early and abundant fruit crop, owing to the partial development of the fruit buds during the warm periods in the winter. It will be readily understood that nature cannot be depended upon for this purpose inasmuch as it often happens that after a warm spell and when the buds have more or less developed the temperature will fall below the freezing point without any rain and then it is that the buds will be injured and perhaps the trees killed. It is the spraying of the trees at such periods after a warm spell as when the temperature falls without rain; nature cannot be depended upon to at all times provide rain at such times as is necessary to protect the buds.

Having thus described my invention, what I claim to be new, and desire to secure by Letters Patent, is—

1. The method of mechanically protecting the fruit buds of fruit trees, which consists in mechanically incasing the buds in a covering of ice, substantially as and for the purpose specified.

2. The herein described method of mechanically protecting the fruit buds upon fruit trees from the action of frost; which consists in mechanically or artificially spraying the trees with water upon the re-occurrence of each depression in temperature following warm or mild weather during the spring or winter season, and permitting the spray to freeze upon the limbs, thus incasing the fruit buds in a covering of artificially produced ice, substantially as described.

In testimony whereof I affix my signature in presence of two witnesses.

GEORGE ANDREW BABBITT.

Witnesses:
A. T. LADD,
J. W. YAGER.